United States Patent
Tanaka (10) Patent No.: US 10,520,875 B2
(45) Date of Patent: Dec. 31, 2019

(54) IMAGE FORMING APPARATUS

(71) Applicant: CANON KABUSHIKI KAISHA, Tokyo (JP)

(72) Inventor: Takatoshi Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 15/496,771

(22) Filed: Apr. 25, 2017

(65) Prior Publication Data

US 2017/0308027 A1   Oct. 26, 2017

(30) Foreign Application Priority Data

Apr. 26, 2016 (JP) .................. 2016-088251

(51) Int. Cl.
  *G03G 21/16* (2006.01)
  *G03G 15/00* (2006.01)
  *H04N 1/00* (2006.01)

(52) U.S. Cl.
  CPC ......... *G03G 21/1619* (2013.01); *G03G 15/60* (2013.01); *G03G 15/602* (2013.01); *G03G 21/1623* (2013.01); *H04N 1/00631* (2013.01); *H04N 1/00795* (2013.01); *H04N 2201/0094* (2013.01)

(58) Field of Classification Search
  CPC ............... G03G 21/1619; G03G 15/60; G03G 21/1623; G03G 15/602; H04N 1/00795; H04N 1/00631; H04N 2201/0094
  See application file for complete search history.

(56) References Cited

U.S. PATENT DOCUMENTS

| | | | |
|---|---|---|---|
| 4,269,502 A * | 5/1981 | Tsuda | G03G 15/60 355/51 |
| 6,177,977 B1 | 1/2001 | Tanaka et al. | |
| 6,185,381 B1 | 2/2001 | Nakahara et al. | |
| 7,416,178 B2 | 8/2008 | Ito | |
| 2005/0281597 A1* | 12/2005 | Ito | G03G 15/6573 399/395 |

FOREIGN PATENT DOCUMENTS

| | | |
|---|---|---|
| JP | 2005-242267 A | 9/2005 |
| JP | 2006-001141 A | 1/2006 |
| JP | 2013-250395 A | 12/2013 |
| JP | 2014-048530 A | 3/2014 |

* cited by examiner

*Primary Examiner* — David H Banh
(74) *Attorney, Agent, or Firm* — Venable LLP (57) ABSTRACT

An image forming apparatus includes a printer portion; an image reading portion rotatable relative to the printer portion; a discharge portion configured to stack the recording material discharged from an inside of the printer portion, the discharge portion being supported rotatably relative to the printer portion; and a regulating member provided between the discharge portion and the image reading portion and configured to regulate movement of the recording material stacked on the discharge portion. When the image forming apparatus is seen in a rotational axis direction of the image reading portion, at least a part of the regulating member in a state in which the image reading portion and the discharge portion are open away from the printer portion is hidden inside a contour of a casing of the image reading portion.

8 Claims, 10 Drawing Sheets

IMAGE FORMING APPARATUS

FIELD OF THE INVENTION AND RELATED ART

The present invention relates to an image forming apparatus such as an electrophotographic copying machine, an electrophotographic printer (for example, a laser beam printer, an LED printer or the like), an ink jet printer, or a facsimile machine.

In the image forming apparatus, an in-body sheet (paper) discharging type for the purpose of space saving has been widely known. The image forming apparatus of this in-body sheet discharging type includes a discharge tray (discharge portion), for stacking a sheet on which an image is formed and which is discharged, provided between an image forming portion and an image reading unit as an image reading portion provided on the image forming portion.

Further, the discharge tray is openably supported by an apparatus main assembly, and in a state in which the discharge tray is put in an open state, a user or an operator makes access to an inside of the apparatus main assembly and carries out various maintenance operations such as cartridge exchange and jam clearance. Such a constitution has been known.

Conventionally, in order to widely ensure a working (operating) space in which the maintenance operation is carried out, a constitution for largely opening the discharge tray has been proposed. For example, Japanese Laid-Open Patent Application (JP-A) 2013-250395 discloses a constitution in which a part of a main body of the discharge tray projects upward and the projected portion enters the discharge tray main body when the discharge tray is put in an open state, and thus a rotatable angle of the discharge tray is made large.

In recent years, there is a tendency that an angle of the discharge tray approaches horizontality with downsizing of the image forming apparatus. In the case where the tray angle approaches the horizontality, the sheet discharged from an inside of the apparatus is liable to run out and it has become difficult to stack the sheet at a desired position. For this reason, a constitution in which a guiding member as a regulating member for regulating movement of the sheet is provided between the discharge tray and an image reading unit and thus the sheet is easily stacked at the desired position has been known.

However, in the constitution disclosed in JP-A 2013-250395, in the case where the above-described guiding member is provided, the discharge tray and the guiding member interfere with each other when the discharge tray is opened and the rotatable angle of the discharge tray is limited, so that there is a liability that the working space for the maintenance becomes small.

SUMMARY OF THE INVENTION

The present invention has been accomplished in view of the above-described circumstances. A principal object of the present invention is to provide an image forming apparatus capable of largely opening a discharge portion in a constitution in which a regulating member is provided between an image reading portion and the discharge portion.

According to an aspect of the present invention, there is provided an image forming apparatus comprising: a printer portion configured to form an image on a recording material; an image reading portion mounted on the printer portion and configured to read an image on an original, the image reading portion being rotatable relative to the printer portion; a discharge portion configured to stack the recording material discharged from an inside of the printer portion, the discharge portion being supported rotatably relative to the printer portion; and a regulating member provided between the discharge portion and the image reading portion and configured to regulate movement of the recording material stacked on the discharge portion, wherein when the image forming apparatus is seen in a rotational axis direction of the image reading portion, at least a part of the regulating member in a state in which the image reading portion and the discharge portion are open away from the printer portion is hidden inside a contour of a casing of the image reading portion.

Further features of the present invention will become apparent from the following description of exemplary embodiments with reference to the attached drawings.

DESCRIPTION OF EMBODIMENTS

First Embodiment

<Image Forming Apparatus>

In the following, a general structure of an image forming apparatus A according to the present invention will be specifically described together with an operation of the image forming apparatus A during image formation with reference to the drawings. Incidentally, shapes and relative positions of constituent elements described in the following embodiments should be appropriately be changed depending on structures and various conditions of devices (apparatuses) to which the present invention is applied. Accordingly, the scope of the present invention is not intended to be limited to the following embodiments unless otherwise specified.

Figure 1:
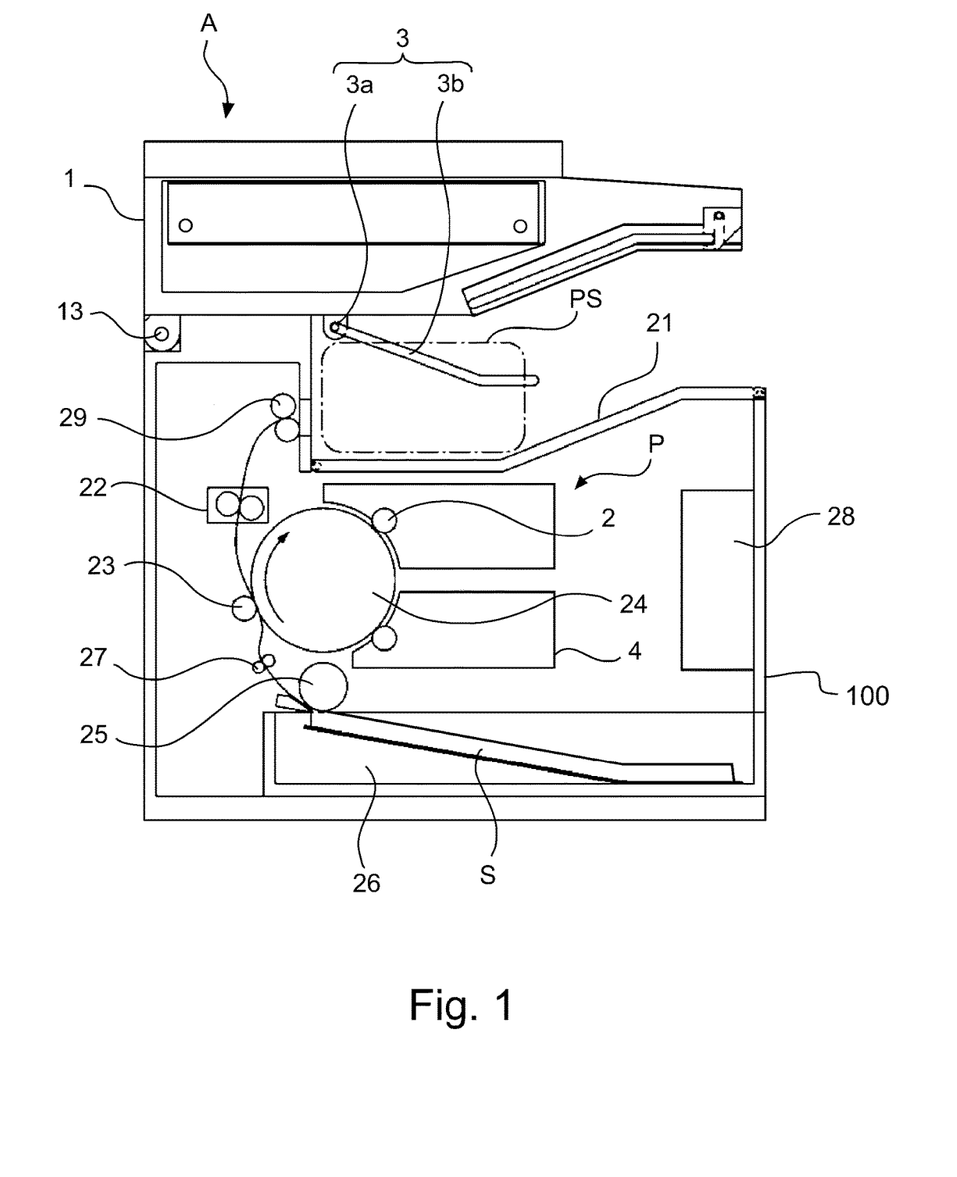
FIG. 1 is a schematic sectional view of an image forming apparatus according to a First Embodiment.

The image forming apparatus A includes an image reading portion 1 for reading an image on an original and a printer portion 100 for forming the image on a sheet. The image reading portion 1 is provided on the printer portion 100.

As shown in FIG. 1, the printer portion 100 includes a process cartridge P detachably mountable to an apparatus main assembly (printer portion 100), a laser scanner unit 28, a transfer roller 23 and the like. The process cartridge P includes a photosensitive drum 24 (image bearing member), a charging roller 2 and a developing device 4. In the case where toner in the process cartridge P is used up, the process cartridge can be replaced with a new (fresh) process cartridge.

Figure 2:
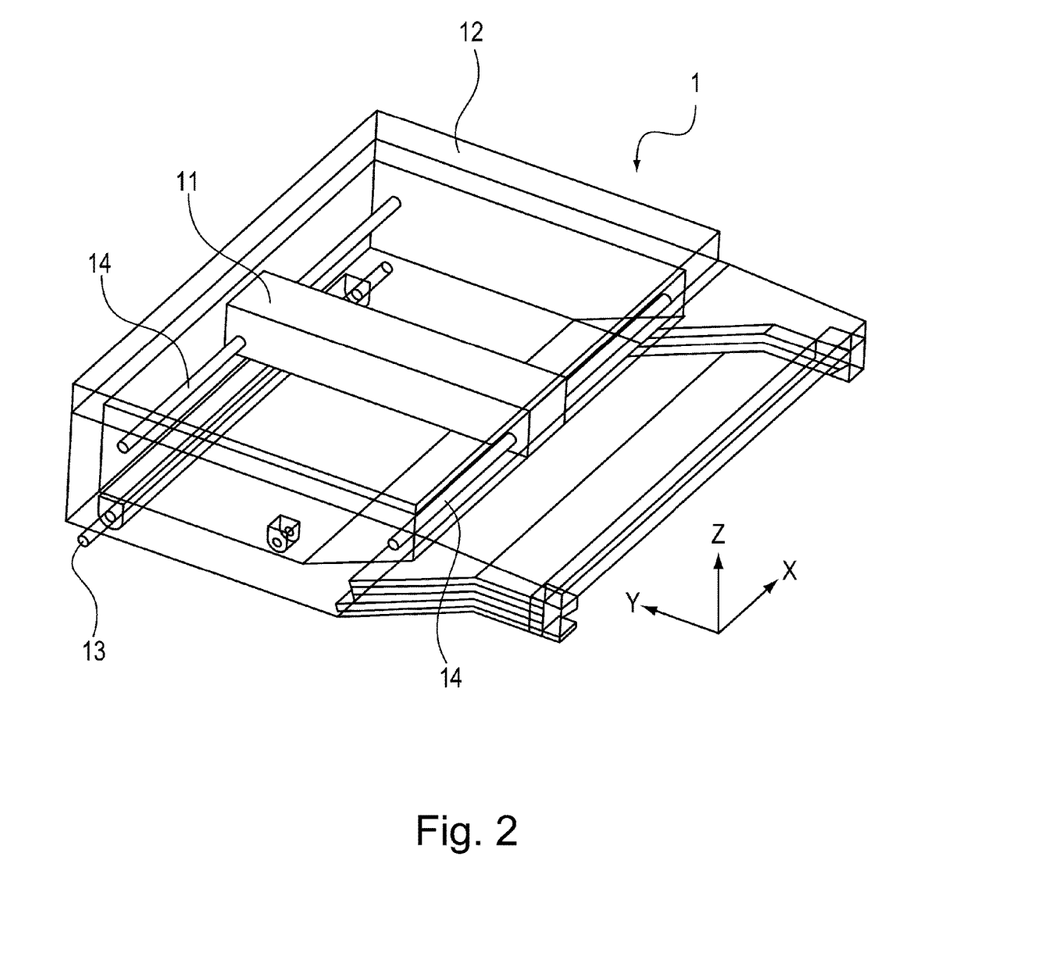
FIG. 2 is a perspective view of an image reading unit in the First Embodiment.

Further, on the printer portion 100, the image reading unit 1 as an image reading portion for reading the image on the original is provided. As shown in FIG. 2, the image reading unit 1 in this embodiment is an image scanner of a flat head type in which the image on the original pressed by an original cover 12 is read.

The image reading unit 1 includes an image inputting portion 11 where the image on the original is inputted (i.e., the original is subjected to scanning) and a moving mechanism 14 for moving the image inputting portion 11. The moving mechanism 14 includes a motor (unshown) and a guiding portion and moves the image inputting portion 11 in an arrow X direction. The image inputting portion 11 includes an unshown light source and an image sensor and scans the image on the original with respect to a main scan direction (arrow Y direction) while being moved in a sub scan direction (arrow X direction) by the moving mechanism 14. Incidentally, it is assumed that as the light source, a white fluorescent lamp, an LED or the like is used.

Further, the image reading unit 1 includes a hinge portion 13 and is supported so as to be rotatable about the hinge portion 13 by a predetermined angle. Further, the image reading unit 1 can be opened by being rotated in a direction of being spaced from a discharge tray 21. That is, the image reading unit 1 is supported by the apparatus main assembly (printer portion 100) openably relative to the apparatus main assembly. Further, in order to alleviate a load of a user (operator) during opening and closing of the image reading unit, the hinge portion 13 is provided with an unshown weight balancing mechanism for supporting the opening and closing operation.

Incidentally, on the apparatus main assembly (printer portion 100) of the image forming apparatus A, an unshown locking portion for locking the image reading unit 1 at a closed position and a lock-eliminating (releasing) button for eliminating a locked state are provided. Then, the lock-eliminating button is pressed and thereafter the image reading unit 1 is raised, so that the image reading unit 1 can be opened. At this time, the image reading unit 1 can be raised with a light force by the weight balancing mechanism, and an attitude of the opened image reading portion 1 is maintained at an open position thereof.

Next, an image forming operation will be described. As shown in FIG. 1, when a controller (unshown) outputs an image forming signal, a sheet S stacked on a sheet stacking portion 26 is fed toward an image forming portion including the photosensitive drum 24 and the like by a feeding roller 25 and a registration roller pair 27.

On the other hand, at the image forming portion, a charging bias is applied to the charging roller 2, so that a surface of the photosensitive drum 24 is electrically charged.

Thereafter, the laser scanner unit 28 scans the photosensitive drum 24 with a laser beam on the basis of image data or the like generated by the image reading unit 1. As a result, a potential of the photosensitive drum 24 partly lowers, so that an electrostatic latent image depending on image information is formed on the surface of the photosensitive drum 24.

Thereafter, toner is deposited on the electrostatic latent image, formed on the surface of the photosensitive drum 24, by the developing device 4, so that a toner image is formed. The toner image formed on the surface of the photosensitive drum 24 is sent into a transfer nip formed between the photosensitive drum 24 and a transfer roller 23. When the toner image reaches the transfer nip, a transfer bias of an opposite polarity to a charge polarity of the toner is applied to the transfer roller 23, so that the toner image is transferred onto the sheet.

Thereafter, the sheet on which the toner image is transferred is sent to a fixing device 22 and is heated and pressed at a fixing nip formed between a heating portion and a pressing portion of the fixing device 22, so that the toner image is fixed on the sheet. Thereafter, the sheet is fed by a discharging roller pair 29 and is discharged on the discharge tray 21.

Incidentally, in a space PS between the discharge tray 21 and the image reading unit 1, a guiding member 3 is constituted by a rotation shaft 3a and a guiding portion 3b, and the guiding portion 3b is supported rotatably about the rotation shaft. Then, the guiding portion 3b contacts the sheet discharged from an inside of the printer portion 100 onto the discharge tray 21, so that movement of the sheet in a discharge direction and excessive upward movement of the sheet are regulated by a self-weight of the guiding portion 3b or a load torque of the rotation shaft.

<Discharge Portion>

Next, a constitution of the discharge tray 21 as a discharge portion will be described. In this embodiment, the discharge tray 21 is supported openably relative to the apparatus main assembly (printer portion 100) of the image forming apparatus A.

Figure 3:
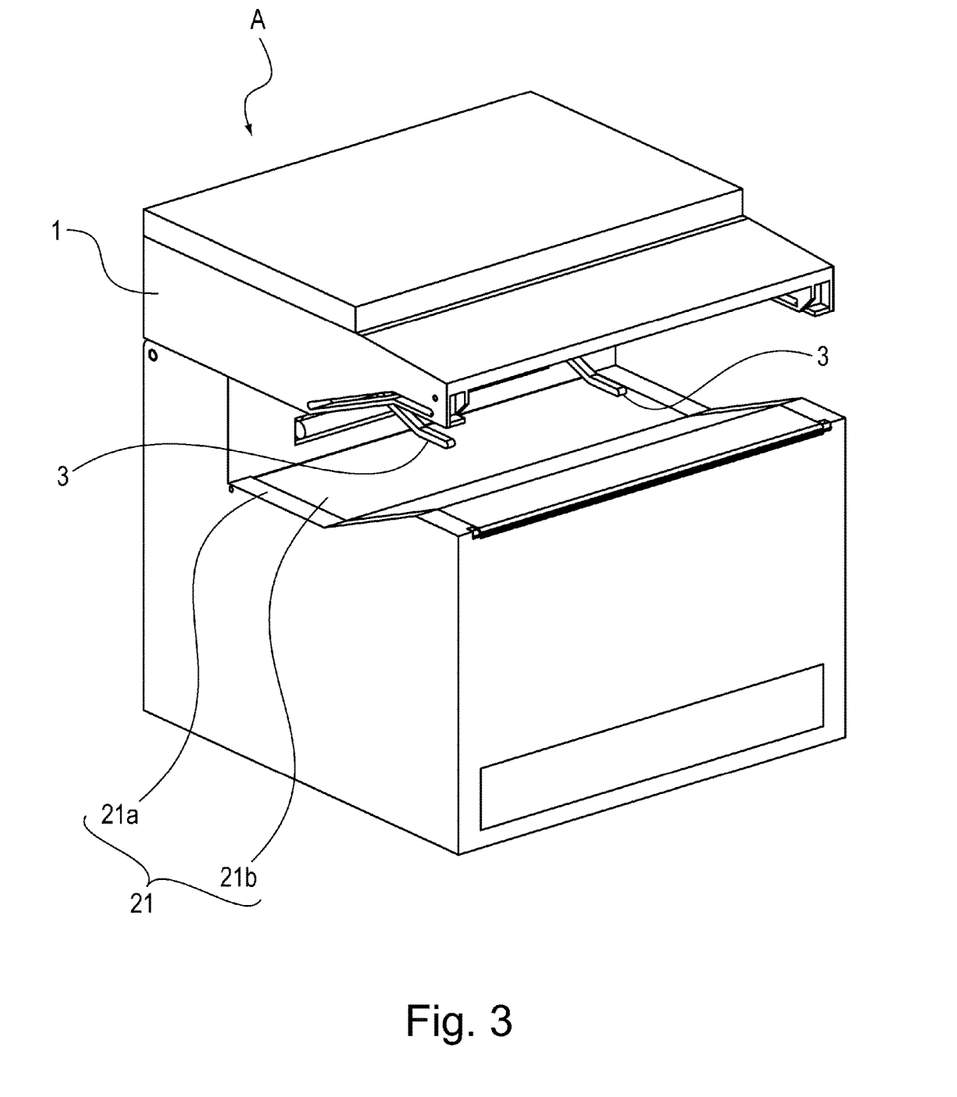
FIG. 3 is a perspective view of the image forming apparatus in a state in which a discharge tray is closed in the First Embodiment.
Figure 4:
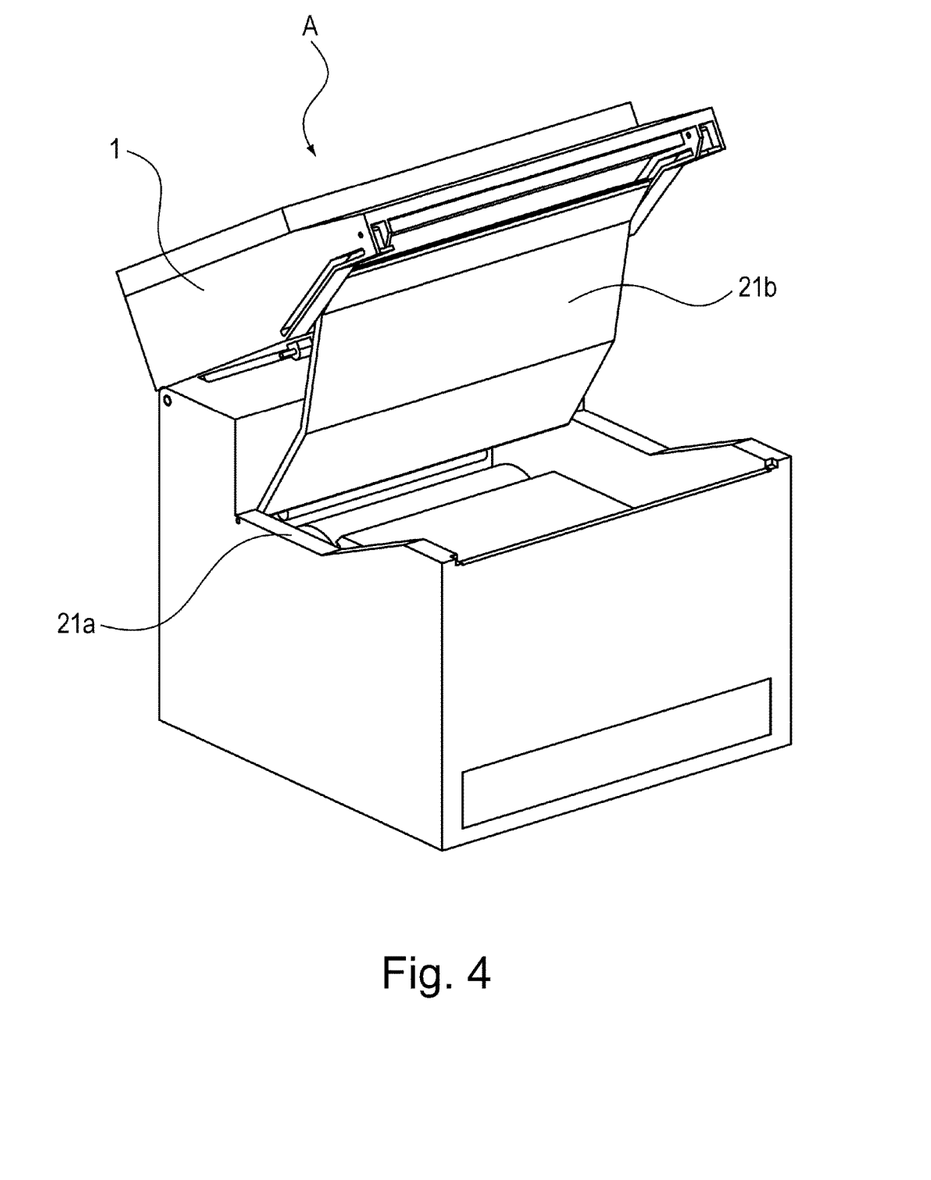
FIG. 4 is a perspective view of the image forming apparatus in a state in which the discharge tray is opened in the First Embodiment.

FIG. 3 is a perspective view of the image forming apparatus A in a state in which the image reading unit 1 and the discharge tray 21 are closed, and FIG. 4 is a perspective view of the image forming apparatus A in a state in which the image reading unit 1 and the discharge tray 21 are open.

As shown in FIGS. 3 and 4, the discharge tray 21 is constituted by a top cover 21a which is an outer casing of the apparatus main assembly (printer portion 100) and a maintenance cover 21b supported openably relative to the printer portion 100. Further, the maintenance cover 21b is opened in a direction of approaching the image reading unit 1 disposed above the maintenance cover 21b, so that an opening communicating with the image forming portion is formed and, through this opening, exchange of the process cartridge P and jam clearance can be carried out.

That is, the discharge tray 21 as a discharge portion for stacking the sheet discharged from an inside of the printer portion 100 is supported openably relative to the printer portion 100, and forms the opening communicating with the image forming portion by being opened in a direction (upward direction) of approaching the image reading unit 1.

Further, the printer portion 100 is provided with an unshown cover locking portion and an unshown cover lock-releasing (eliminating) button. In a normal state, the maintenance cover 21b is locked by the cover locking portion to be prevented from opening. On the other hand, during maintenance, the cover lock-releasing button is pressed, so that the locking is released (eliminated) and thus the maintenance cover 21b is put in an openable state.

<Opening and Closing Operation of Discharge Portion>

Next, an opening and closing operation of the discharge tray 21 as the discharge portion will be described.

Figure 5:
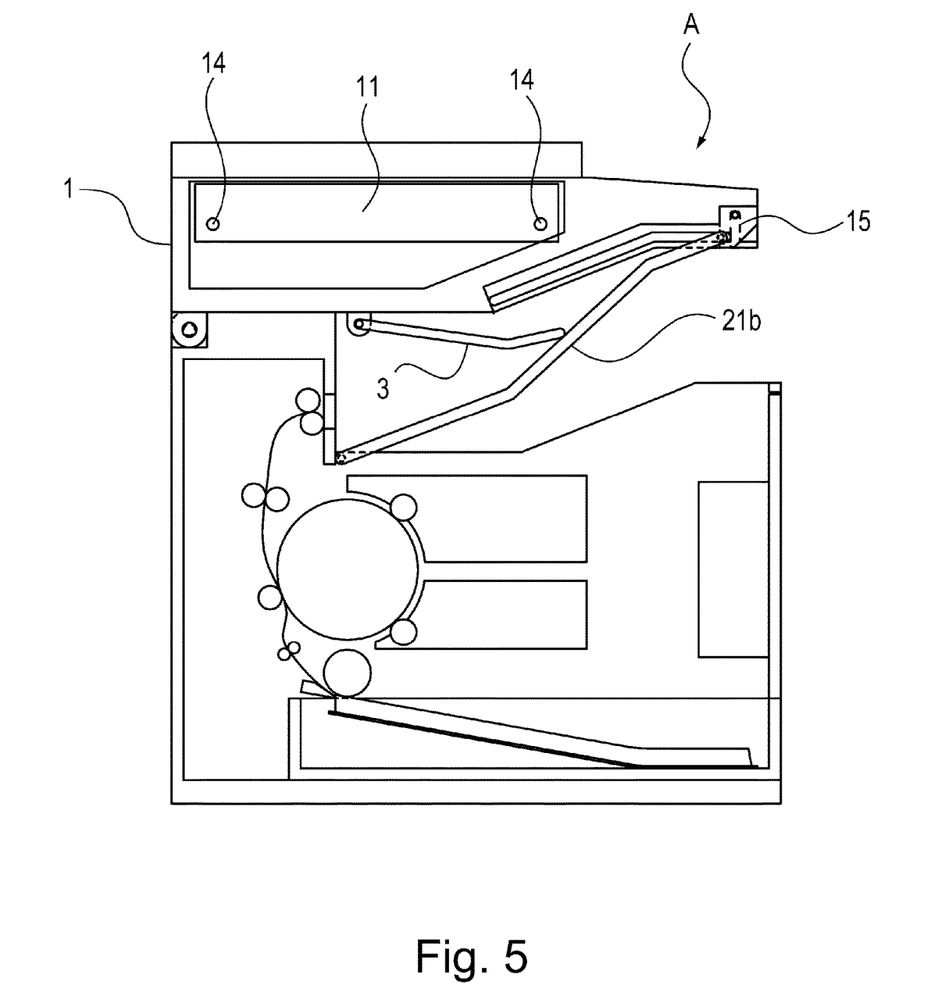
FIG. 5 is a schematic sectional view of the image forming apparatus when the discharge tray is opened in a state in which the image reading unit in the First Embodiment is closed.

FIG. 5 is a schematic sectional view of the image forming apparatus A when the maintenance cover 21b as a part of the discharge tray 21 is opened in a state in which the image reading unit 1 is closed. As shown in FIG. 5, when the maintenance cover 21b is raised in the closed state of the image reading unit 1, the maintenance cover 21b is held by a cover holding portion 15 provided on the image reading unit 1.

Figure 6:
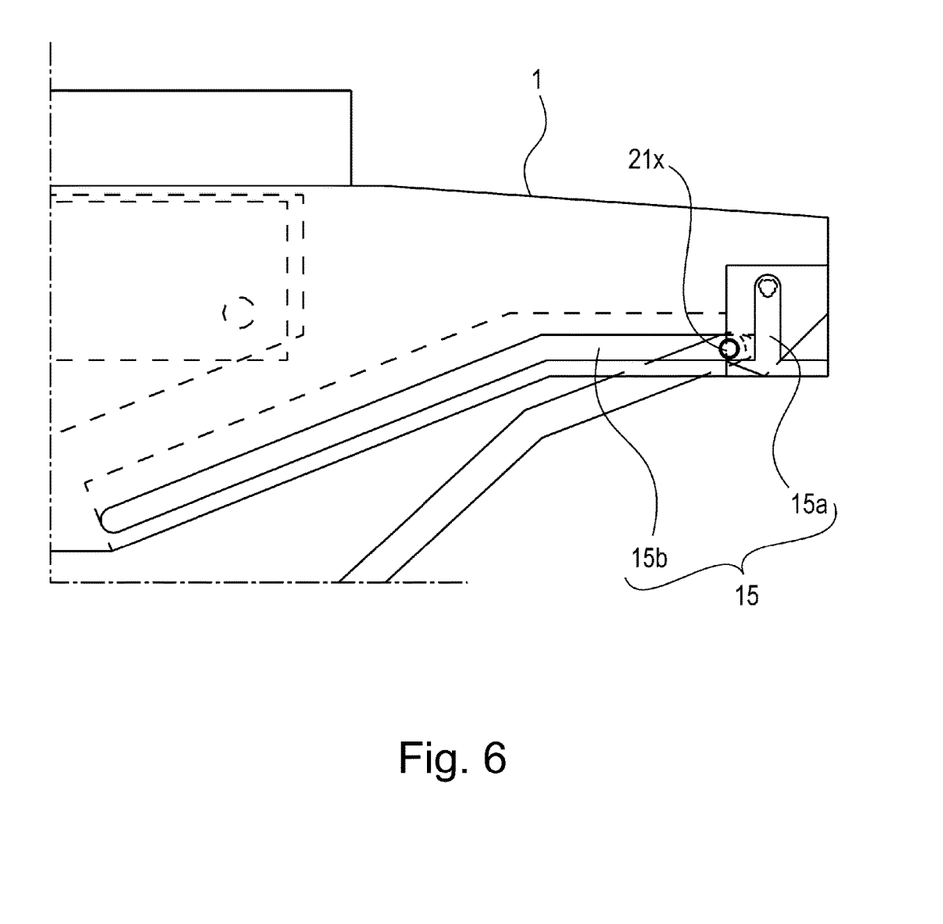
FIG. 6 is a sectional view of a cover holding portion in the First Embodiment.

The cover holding portion 15 is provided with a locking portion 15a and a guiding portion 15b as shown in FIG. 6. Further, when the cover holding portion 15 is in the state shown in FIG. 5, a projected portion 21x provided on the maintenance cover 21b engages with the locking portion 15a, so that the maintenance cover 21b is locked by the cover holding portion 15. Incidentally, at this time, the guiding member 3 is in a state in which the guiding member 3 is supported by the maintenance cover 21b (FIG. 5).

Figure 7:
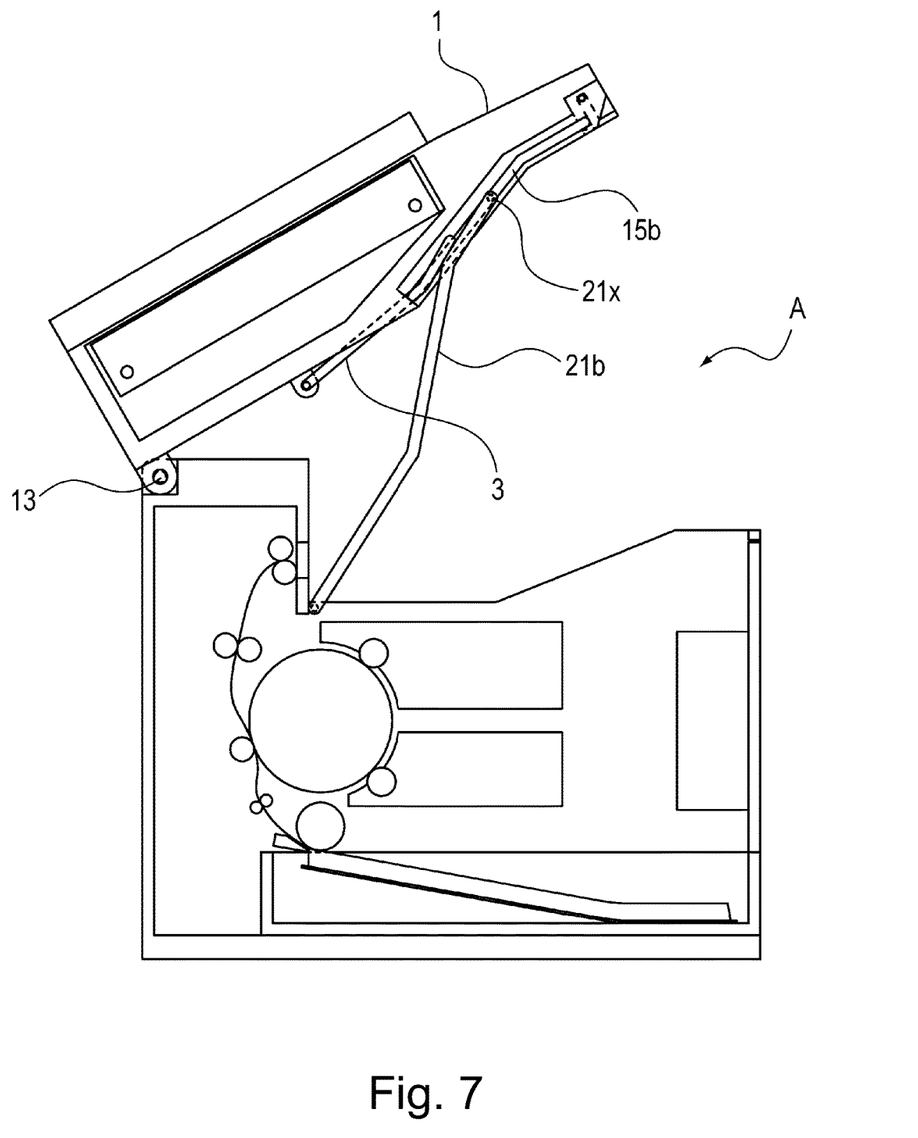
FIG. 7 is a schematic sectional view of the image forming apparatus in a state in which the image reading unit and the discharge tray in the First Embodiment are opened.

FIG. 7 is a schematic sectional view of the image forming apparatus A when the image reading unit 1 is changed in state from the state of FIG. 5 to an open state.

As shown in FIG. 7, when the image reading unit 1 is opened in a state in which the maintenance cover 21b is held by the cover holding portion 15, the maintenance cover 21b is interrelated with the image reading unit 1 and is opened upward. Further, the guiding member 3 is supported by the maintenance cover 21b, and therefore, also the guiding member 3 moves in the same direction.

At this time, at the cover holding portion 15, the projected portion 21x moves to the guiding portion 15b and is interrelated with the opening operation of the image reading unit 1, so that the projected portion 21x moves in the guiding portion 15b.

Further, in interrelation with the opening operation of the image reading unit 1, a part of the guiding member 3 is accommodated inside the image reading unit 1. That is, in the case where the apparatus A is seen in a rotational axis direction of the image reading unit 1, at least a part of the guiding member (regulating member) 3 in a state in which the image reading unit 1 and the discharge portion 21b are opened relative to the printer portion 100 is hidden inside a contour of a casing of the image reading portion 1.

Thus, a constitution in which at least the part of the guiding member 3 is capable of being accommodated inside the image reading unit 1 is employed, so that it is possible to suppress limitation of a rotation angle of the discharge tray 21 by the guiding member 3. Accordingly, during maintenance, a working (operation) space can be largely ensured, so that operativity can be improved.

Further, the cover holding portion 15 for holding the maintenance cover 21b is provided, so that during a maintenance operation, the open state of the maintenance cover 21b can be maintained, and thus operativity of the maintenance can be improved. Further, the cover holding portion 15 is not provided as a separate member, but is provided on the image reading unit 1, so that it is possible to reduce the number of parts, and thus space saving and construction can be realized.

In the case where the maintenance operation is ended and the maintenance cover 21b is closed, first, the image reading unit 1 is returned to the closed position. Thereafter, the unshown lock-releasing button provided on the locking portion 15a of the cover holding portion 15 is pressed, so that the maintenance cover 21b is released from the image reading unit 1 and then the maintenance cover is returned to the closed position.

Incidentally, in this embodiment, a constitution in which the cover holding portion 15 is provided on the image reading unit 1 and in which the image reading unit 1 and the discharge tray 21 are interrelated with each other and are in the open state was described. However, the present invention is not limited thereto, but a constitution in which the image reading unit 1 and the discharge tray 21 can be separately opened and closed may also be employed.

Further, in this embodiment, a constitution in which the guiding member 3 is accommodated inside the image reading unit 1 in interrelation with the opening operation of the discharge tray 21 was described. However, the present invention is not limited thereto, but a constitution in which the operation for opening the discharge tray 21 and the operation for accommodating the guiding member 3 are separate from each other may also be employed.

Second Embodiment

Next, a Second Embodiment of the present invention will be described using FIG. 8. Portions for which description is redundant with those in First Embodiment described above are represented by the same reference numerals or symbols and will be omitted from description.

Figure 8:
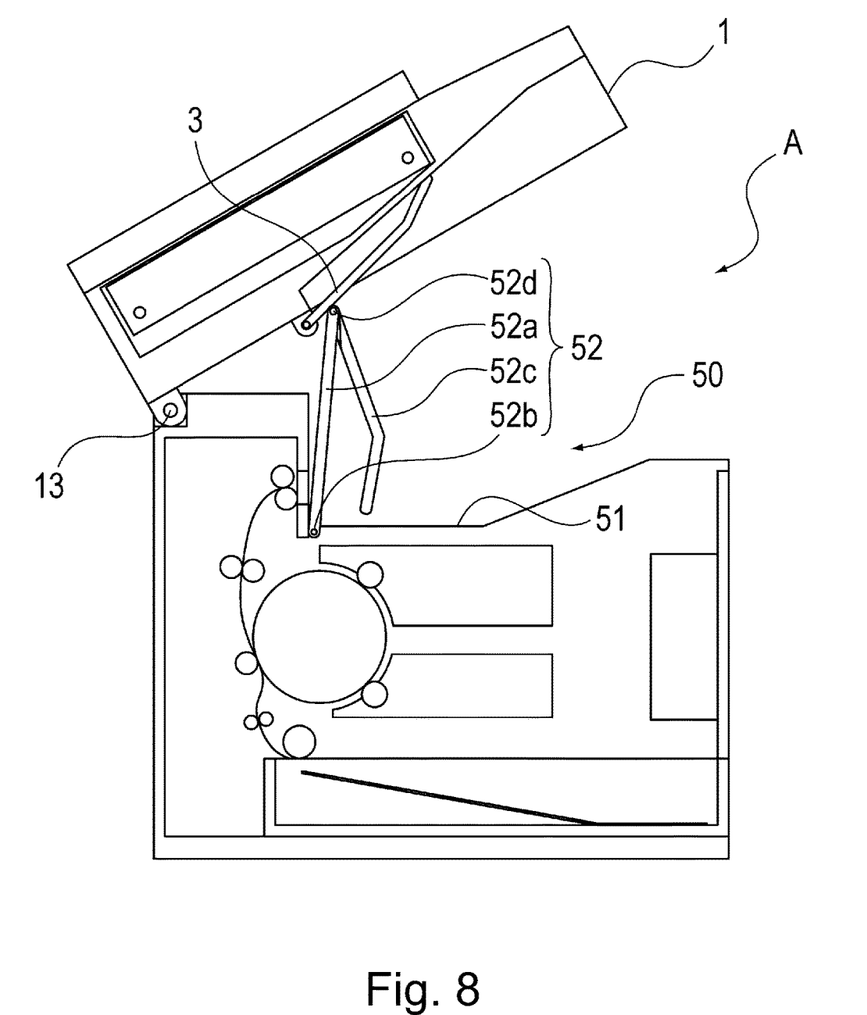
FIG. 8 is a schematic sectional view of an image forming apparatus according to a Second Embodiment in a state in which an image reading unit and a discharge tray are opened.

FIG. 8 is a schematic sectional view of an image forming apparatus A in a state in which a discharge tray 50 (discharge portion) in this embodiment is open. As shown in FIG. 8, the discharge tray 50 is constituted by a top cover 51 which is an outer casing of an apparatus main assembly and a maintenance cover 52 supported openably relative to the apparatus main assembly. Further, the maintenance cover 52 is opened, so that an opening communicating with an image forming portion is formed.

Further, the maintenance cover 52 in this embodiment is provided with a first cover 52a, a first rotation shaft 52b rotatably supporting the first cover 52a, a second cover 52c, and a second rotation shaft 52d rotatably supporting the second cover 52c. The second cover 52c is supported by the first cover 52a so as to be rotatable about the second rotation shaft 52d, so that the maintenance cover 52 is configured to be bendable.

Next, an operation for opening the discharge tray 50 will be described.

First, a lock-releasing button (unshown) of the image reading unit 1 is pressed, so that the image reading unit 1 is put in an openable state. Thereafter, the image reading unit 1 is moved (opened) upward and is put in an open state. At this time, the guiding member 3 supported by the image reading unit 1 moves upward in interrelation with the image reading unit 1.

Next, an unshown cover lock-releasing button is pressed, so that the maintenance cover 52 is put in an openable state. Then, the first cover 52a and the second cover 52c are rotated upward. Thereafter, the second cover 52c is bent. At this time, the bent second cover 52c raises the guiding member 3 upward, so that a part of the guiding member 3 is accommodated (hidden) inside the image reading unit 1.

Thus, a constitution in which at least the part of the guiding member 3 is accommodated inside the image reading unit 1 is employed, so that it is possible to suppress limitation of a rotation angle of the discharge tray 50 by the guiding member 3. Accordingly, during maintenance, a working (operation) space can be largely ensured, so that operativity can be improved.

Further, a constitution in which the discharge tray 50 is bendable is employed, so that a working space can be further enlarged depending on intention of a maintenance operator, and thus operativity is improved.

Incidentally, also in this embodiment, similarly as in the First Embodiment, a constitution in which a cover holding portion for holding the maintenance cover 52 is provided and the open state of the maintenance cover 52 can be maintained may also be employed. As a result, operativity of the maintenance can be improved. Further, the cover holding portion is provided on the image reading unit 1, so that it is possible to reduce the number of parts, and thus space saving and construction can be realized. Further, by employing a constitution in which the discharge tray 50 is bendable, latitude in arrangement when the cover holding portion for holding the maintenance cover 52 is improved, so that latitude in design is improved.

Third Embodiment

Next, a Third Embodiment of the present invention will be described using FIGS. 9 and 10. Portions for which description is redundant with those in the First and Second Embodiments described above are represented by the same reference numerals or symbols and will be omitted from description.

FIG. 8 is a schematic sectional view of an image forming apparatus A in this embodiment. The image forming apparatus A in this embodiment is, as shown in FIG. 9, constituted in a further thin form compared with the First and Second Embodiments by changing the sheet feeding path during image formation to a sheet feeding path 70.

Figure 10:
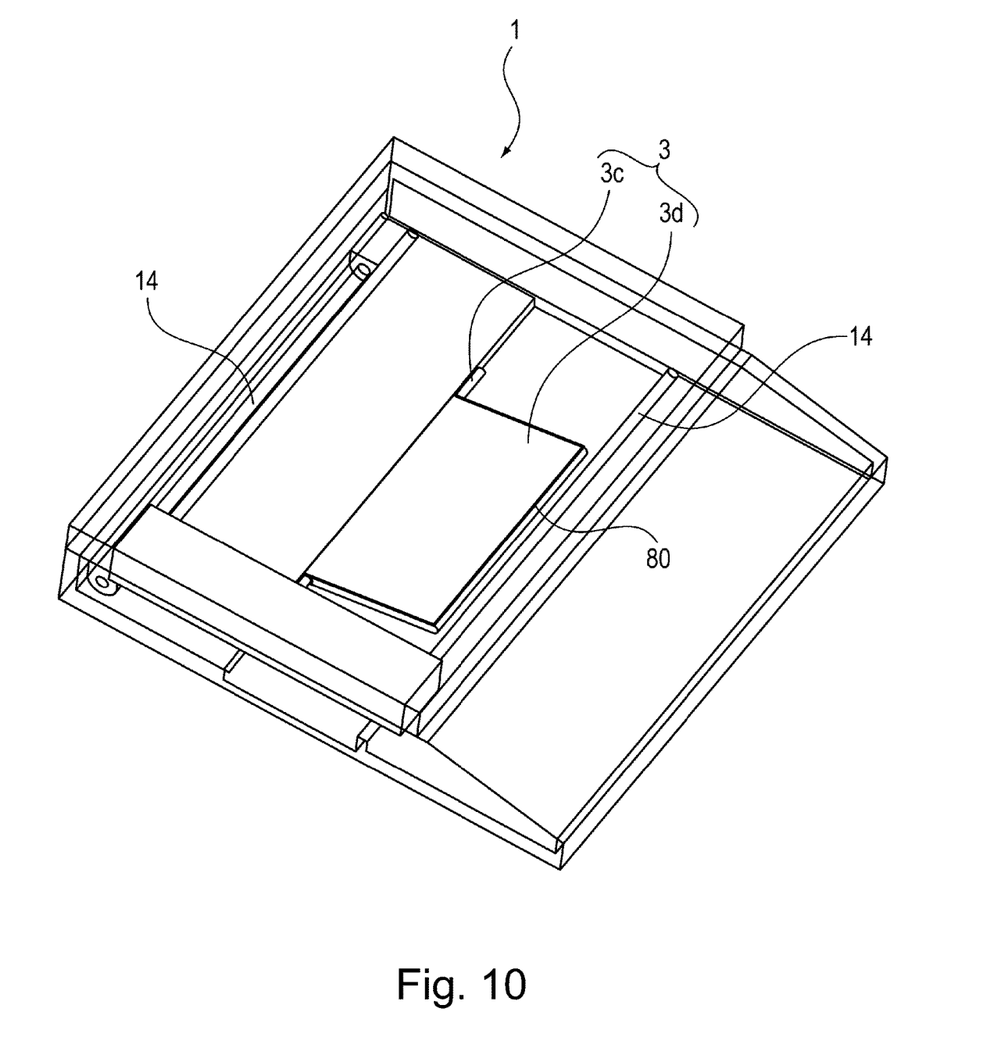
FIG. 10 is a perspective view of the image reading unit in the Third Embodiment.

FIG. 10 is a perspective view of an image reading unit 1. In the image reading unit 1 in this embodiment, as shown in FIG. 10, a guiding portion 3d which is a part of a bottom (outer peripheral surface) of a casing is supported swingably about a swing shaft 3c, and these portions constitute a guiding member 3 for regulating movement of the sheet. Further, a part of the outer peripheral surface of the guiding member 3 is constituted by an elastic member 80.

Next, an operation for opening a discharge tray 60 (discharge portion) will be described. In this embodiment, the discharge tray 60 is constituted by a top cover 60a which is an outer casing of a printer portion and a maintenance cover 60b supported rotatably relative to the printer portion.

Figure 9:
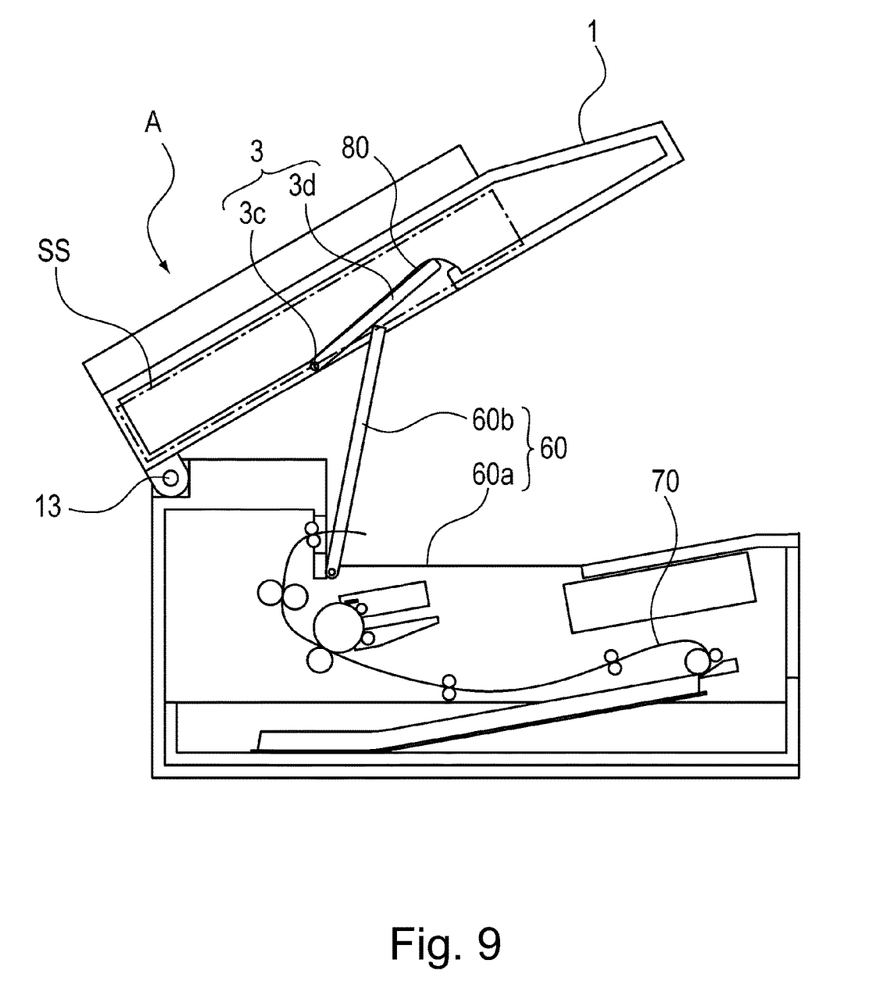
FIG. 9 is a schematic sectional view of an image forming apparatus according to a Third Embodiment in a state in which an image reading unit and a discharge tray are opened.

As shown in FIG. 9, first, a lock-releasing button (unshown) of the image reading unit 1 is pressed, so that the image reading unit 1 is put in an openable state. Thereafter, the image reading unit 1 is moved (opened) upward and is put in an open state.

Next, an unshown cover lock releasing button is pressed, so that the maintenance cover 60b is put in an openable state, and the maintenance cover 60b is rotated upward. At this time, the maintenance cover 60b raises the guiding member 3 upward, so that the guiding member 3 enters a space SS in which scanning by the image inputting portion 11 is to be carried out. That is, a part of the guiding member 3 is in a state in which the part of the guiding member 3 is accommodated inside the image reading unit 1. Incidentally, the image inputting portion 11 is retracted to a position where the image inputting portion 11 does not interfere with the guiding member 3.

Thus, a constitution in which at least the part of the guiding member 3 is accommodated inside the image reading unit 1 is employed, so that it is possible to suppress limitation of a rotation angle of the discharge tray 60 by the guiding member 3. Accordingly, during maintenance, a working (operation) space can be largely ensured, so that operativity can be improved.

Further, at least a part of the outer peripheral surface of the guiding member 3 is constituted by the elastic member 80, so that it is possible to suppress formation of a gap in the outer casing cover at the outer peripheral surface of the image reading unit 1. Accordingly, it is possible to suppress entrance of dust or the like into the inside of the image reading unit 1. Further, it is possible to suppress light emitted by an unshown light source for being leaked out to an outside of the image reading unit. Incidentally, in order to enhance a light-leakage-preventing effect, the elastic member 80 may preferably be formed of a light-blocking material.

Also in this embodiment, similarly as in the First Embodiment, a constitution in which a cover holding portion for holding the maintenance cover 60b is provided and the open state of the maintenance cover 60b can be maintained may also be employed. As a result, operativity of the maintenance can be improved. Further, the cover holding portion is provided on the image reading unit 1, so that it is possible to reduce the number of parts, and thus space saving and cost reduction can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-088251 filed on Apr. 26, 2016, which is hereby incorporated by reference herein in its entirety.

What is claimed is:

1. An image forming apparatus comprising:
a printer portion configured to form an image on a recording material;
an image reading portion mounted on said printer portion and configured to read an image on an original, said image reading portion being rotatable relative to said printer portion;
a discharge portion configured to stack the recording material discharged from an inside of said printer portion, said discharge portion being supported rotatably relative to said printer portion; and
a regulating member provided between said discharge portion and said image reading portion and configured to regulate movement of the recording material stacked on said discharge portion,
wherein when said image reading portion and said discharge portion are open away from said printer portion, (a) said regulating member is moved by said discharge portion, and then (b) an end portion of said regulating member is hidden inside a contour of a casing of said image reading portion as seen in a rotational axis direction of said image reading portion.

2. An image forming apparatus according to claim 1, wherein the end portion of said regulating member is hidden inside the contour of the casing of said image reading portion in interrelation with an operation of opening said image reading portion.

3. An image forming apparatus according to claim 1, wherein said image reading portion includes a holding portion configured to hold said discharge portion, and said holding portion holds said discharge portion in a state in which said discharge portion is open.

4. An image forming apparatus according to claim 3, wherein said holding portion includes a locking portion configured to lock said discharge portion.

5. An image forming apparatus according to claim 1, wherein said discharge portion opens in interrelation with an operation of opening said image reading portion.

6. An image forming apparatus according to claim 1, wherein said regulating member is supported by said image reading portion.

7. An image forming apparatus according to claim 1, wherein said discharge portion is bendable.

8. An image forming apparatus according to claim 1, wherein said discharge portion forms an opening communicating with an image forming portion configured to form the image by being opened.

* * * * *